United States Patent
Hoshino et al.

(10) Patent No.: US 8,345,562 B2
(45) Date of Patent: Jan. 1, 2013

(54) TRANSMITTING APPARATUS, RECEIVING APPARATUS AND MULTIPLEX NUMBER CONTROLLING METHOD

(75) Inventors: Masayuki Hoshino, Kanagawa (JP);
Ryohei Kimura, Kanagawa (JP);
Yasuaki Yuda, Kanagawa (JP);
Tomohiro Imai, Kanagawa (JP);
Kenichi Miyoshi, Kanagawa (JP);
Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 11/915,847

(22) PCT Filed: Jun. 1, 2006

(86) PCT No.: PCT/JP2006/310980
§ 371 (c)(1),
(2), (4) Date: Nov. 28, 2007

(87) PCT Pub. No.: WO2006/129749
PCT Pub. Date: Dec. 7, 2006

(65) Prior Publication Data
US 2009/0268621 A1    Oct. 29, 2009

(30) Foreign Application Priority Data
Jun. 3, 2005    (JP) ................................ 2005-164106

(51) Int. Cl.
*H04J 1/16*    (2006.01)
(52) U.S. Cl. ........ 370/252; 370/277; 370/278; 375/135; 375/136
(58) Field of Classification Search ........................ None
See application file for complete search history.

(56) References Cited

U.S. PATENT DOCUMENTS

| | | | |
|---|---|---|---|
| 7,139,527 B2 * | 11/2006 | Tamaki et al. ................... | 455/16 |
| 2002/0087610 A1 * | 7/2002 | Pether et al. ................... | 708/551 |
| 2004/0167758 A1 | 8/2004 | Takiishi | |
| 2004/0248618 A1 | 12/2004 | Yoshii | |
| 2005/0164645 A1 * | 7/2005 | Li et al. ............................ | 455/69 |
| 2005/0185733 A1 * | 8/2005 | Tolli et al. ...................... | 375/285 |
| 2005/0197162 A1 | 9/2005 | Fujishima | |
| 2005/0265470 A1 | 12/2005 | Kishigami | |
| 2006/0084461 A1 | 4/2006 | Sekiya | |
| 2006/0227889 A1 * | 10/2006 | Uchida et al. .................. | 375/260 |
| 2007/0025464 A1 * | 2/2007 | Perlman ......................... | 375/267 |

(Continued)

FOREIGN PATENT DOCUMENTS

EP         1207645        5/2002

(Continued)

OTHER PUBLICATIONS

International Search Report dated Jun. 27, 2006.

(Continued)

*Primary Examiner* — Kibrom T Hailu
*Assistant Examiner* — Zewdu A Beyen
(74) *Attorney, Agent, or Firm* — Dickinson Wright PLLC

(57) ABSTRACT

A spatial multiplex number controlling method and others wherein streams can be separated for each of receivers and the transmission efficiency can be improved. In a receiving apparatus, a PER is calculated from a history of CRC test results per stream multiplex number. A reception quality and an offset corresponding to the calculated PER are fed back to a transmitting apparatus. The transmitting apparatus assigns, based on the fed-back reception quality and offset, the streams, thereby controlling the stream multiplex number.

10 Claims, 10 Drawing Sheets

U.S. PATENT DOCUMENTS

2010/0172309 A1* 7/2010 Forenza et al. ............... 370/329
2011/0235537 A1* 9/2011 Zhang et al. .................. 370/252

FOREIGN PATENT DOCUMENTS

| | | |
|---|---|---|
| JP | 2002-217752 | 8/2002 |
| JP | 2004-23716 | 1/2004 |
| JP | 2004-201296 | 7/2004 |
| JP | 2004-254250 | 9/2004 |
| JP | 2004-297172 | 10/2004 |
| JP | 2005-252521 | 9/2005 |
| JP | 2006-115414 | 4/2006 |

OTHER PUBLICATIONS

Japanese Office Action dated Oct. 25, 2011.

Y. Fujino, et al., "Multiusers MIMO ni okeru Tekio Kukan Taju Kazu Wariate Koka (An Effect of Adaptive Spatial Sub-channel Allocation for Multi-user MIMO System)," The Institute of Electronics, Information and Communication Engineers Sago Taikai Koen Ronbunshu, Mar. 7, 2005, p. 530.

* cited by examiner

| PER | AMOUNT OF OFFSET VARIATION [dB] |
|---|---|
| $p<0.0005$ | -2 |
| $0.0005 \leq p < 0.005$ | -1 |
| $0.005 \leq p < 0.05$ | 0 |
| $0.05 \leq p < 0.5$ | +1 |
| $0.5 \leq p$ | +2 |

FIG.3

TRANSMITTING APPARATUS, RECEIVING APPARATUS AND MULTIPLEX NUMBER CONTROLLING METHOD

TECHNICAL FIELD

The present invention relates to a transmitting apparatus, receiving apparatus and spatial multiplexing number control method used in a wireless communication system utilizing a MIMO (Multiple-Input Multiple-Output) technique for receiving at a plurality of antenna elements radio signals transmitted from a plurality of antenna elements and carrying out wireless communication.

BACKGROUND ART

A technique for providing a plurality of antennas both on the transmitting side and receiving side, preparing a plurality of radio wave channels in a space between the radio transmitting side and the radio receiving side and transmitting spatial multiplex signals through the channels. It is possible to improve transmission efficiency through MIMO.

There is a link adaptation technique as a peripheral technique of MIMO. Link adaptation refers to a technique of adaptively controlling the M-ary modulation number (transmission rate), coding rate and transmission power distribution according to variations in the channel environment between the transmitting side and the receiving side. When link adaptation is applied to MIMO and encoding is carried out and finished on a per stream (transmitting antennas for assigning data or beams) basis, it is possible to effectively utilize MIMO channels. What is referred to as a "stream" here may be referred to as a "codeword" as well. As such a technique, the technique disclosed in Patent Document 1 is known.

FIG. 1 is a block diagram showing a configuration of a MIMO system disclosed in Patent Document 1. In this MIMO system, channel estimator 21 of receiver 20 carries out channel estimation, and power and rate calculator 22 determines the rate and power of each stream using channel estimation values. Receiver 20 feeds back an indicator indicating the rate and power determined by power and rate calculator 22, to transmitter 10.

Transmitter 10 refers to the indicator fed back from receiver 20 and derives the rate and power applied to each stream. As a result of this, it is possible to set transmission rates and transmission power according to propagation conditions of each stream and realize high-speed transmission by keeping the reliability.

By the way, reference signals are orthogonally transmitted between transmitting antennas and interference between the transmitting antennas does not occur. Quality measurement for link adaptation is carried out using the reference signals.

On the other hand, high-speed data channels do not take orthogonal patterns between the transmitting antennas and signals of each transmitting antenna are mixed on the receiving side. For this reason, signals need to be demultiplexed on a per stream basis in a MIMO demodulating section.
Patent Document 1: Japanese Patent Application Laid-Open No. 2002-217752

DISCLOSURE OF INVENTION

Problems to be Solved by the Invention

However, stream demultiplexing capacity in the MIMO demodulating section is influenced by an algorithm applied to a receiver and various kinds of processing performances of the receiver upon demodulation and error correction decoding. That is, the level of the interference signal component and noise component with respect to received quality (for example, SINR (Signal to Interference and Noise Ratio)) measured using the reference signals varies per receiver. Stream demultiplexing capacity decreases when the level of the interference signal component and noise component with respect to received quality are greater, and therefore it is not possible to demultiplex streams on per a receiver basis. For this reason, there is a problem that packet loss occurs and transmission efficiency deteriorates.

It is an object of the present invention to provide a transmitting apparatus, receiving apparatus and spatial multiplexing number control method which make it possible to demultiplex streams per receiver and improve transmission efficiency.

Means for Solving the Problem

The receiving apparatus of the present invention employs a configuration including: a receiving section that receives a stream multiplex signal subjected to stream multiplexing; a spatial demultiplexing estimating section that estimates capacity of the receiving apparatus for demultiplexing the stream multiplex signal into individual streams, for each number of multiplexed streams; an offset setting section that sets an offset for controlling the number of multiplexed streams based on the capacity; a received quality measuring section that measures received quality of each stream based on the stream multiplex signal; and a feedback section that feeds back information showing the offset and the received quality to a transmitting apparatus.

Further, the transmitting apparatus of the present invention employs a configuration including: a stream assigning section that controls a number of multiplexed streams by obtaining information showing an offset and received quality fed back from the above receiving apparatus and carrying out assignment of streams based on the obtained offset and received quality; a modulation and coding scheme determining section that determines a modulation scheme and coding rate applied to the assigned streams based on the received quality of the assigned streams; and a transmission processing section that performs transmission processing of transmission data using the assigned streams and the determined modulation scheme and coding rate.

Advantageous Effect of the Invention

The present invention makes it possible to demultiplex streams per receiver and improve transmission efficiency.

BRIEF DESCRIPTION OF DRAWINGS

FIG. 3 shows the association of PER's and offset change amounts;

BEST MODE FOR CARRYING OUT THE INVENTION

Figure 1:
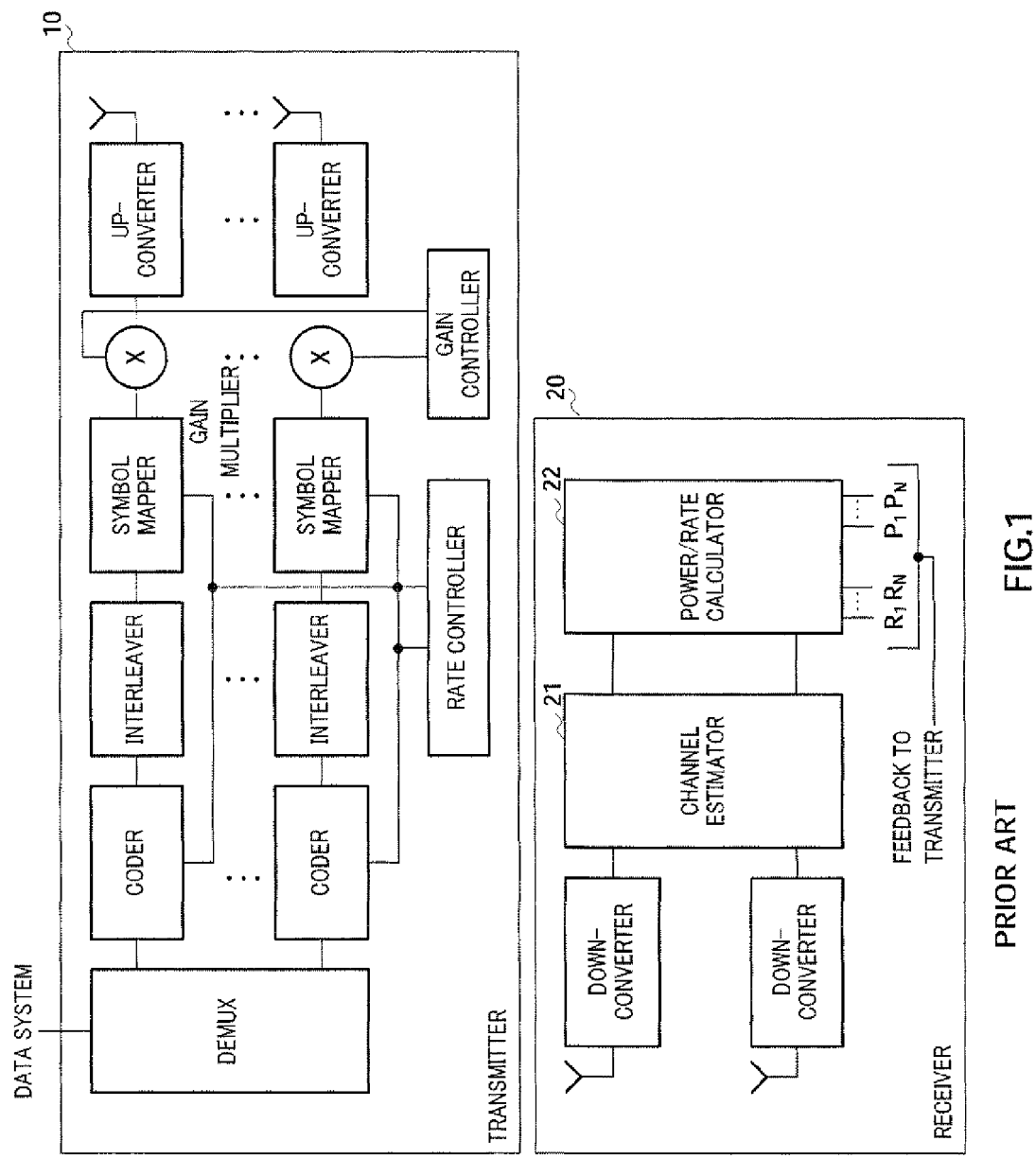
FIG. 1 is a block diagram showing a configuration of the MIMO system disclosed in Patent Document 1.

The embodiments of the present invention will be described in detail with reference to drawings. However, in the embodiments, configurations having the same functions will be assigned the same reference numerals and repetition of description thereof will be omitted.

(Embodiment 1)

Figure 2:
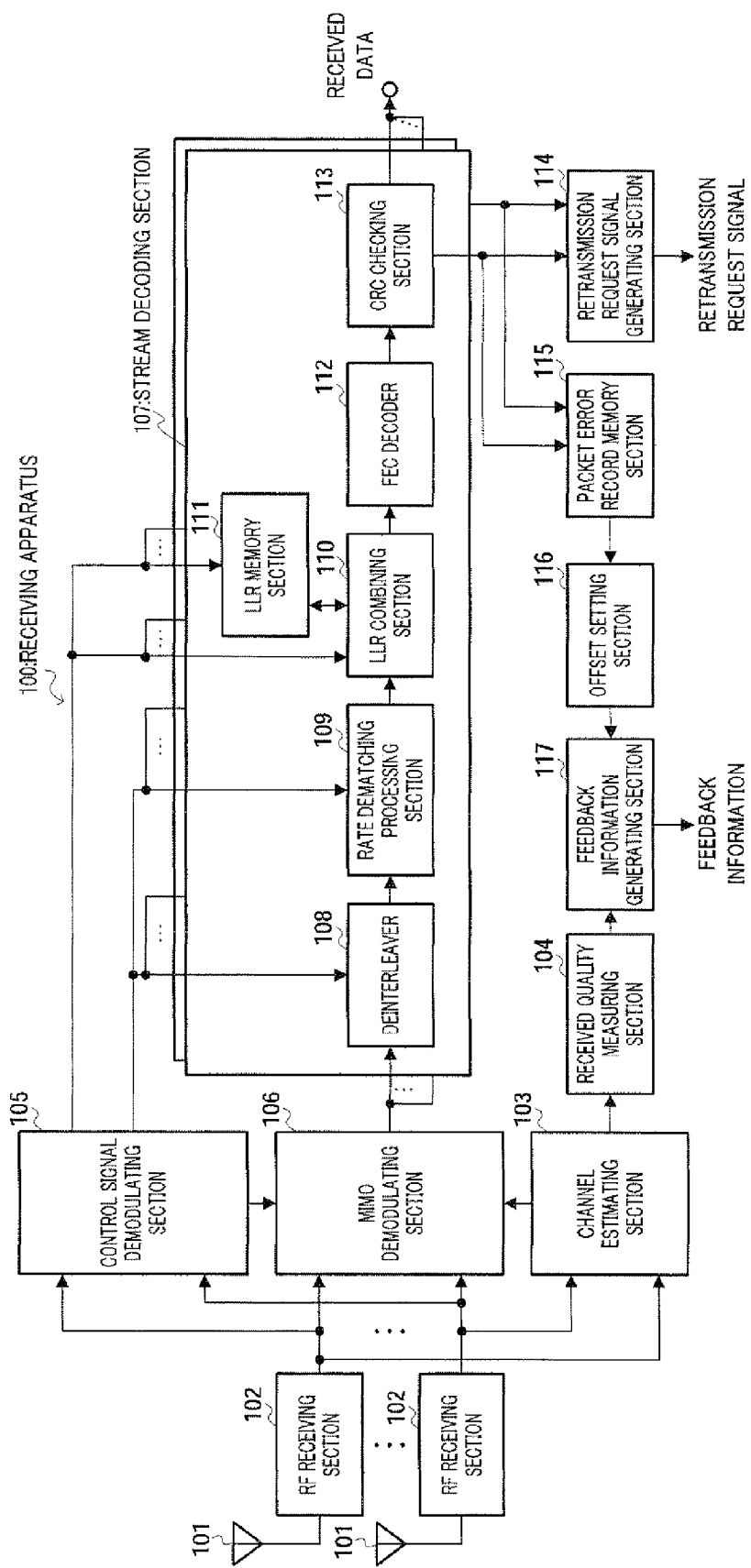
FIG. 2 is a block diagram showing a configuration of the receiving apparatus according to Embodiment 1 of the present invention.

FIG. 2 is a block diagram showing a configuration of receiving apparatus 100 according to Embodiment 1 of the present invention. In this figure, RF receiving sections 102 convert carrier signals of radio frequency received through antennas 101 from a transmitting apparatus, to baseband signals and output the converted baseband signals to channel estimating section 103, control signal demodulating section 105 and MIMO demodulating section 106.

Channel estimating section 103 demodulates the common reference signal from the baseband signals outputted from RF receiving sections 102, calculates channel estimation values (channel matrix) for all combinations of transmitting antennas and receiving antennas and outputs the calculated channel estimation values to received quality measuring section 104 and MIMO demodulating section 106.

Received quality measuring section 104 calculates the SINR (Signal to Interference and Noise Ratio) of each stream as received quality using the channel matrix outputted from channel estimation section 103 and outputs the calculated SINR to feedback information generating section 117. What is referred to as a "stream" here may be referred to as a "codeword" as well.

Control signal demodulating section 105 demodulates modulation information, MIMO multiplex information and coding information from the baseband signals outputted from RF receiving sections 102, outputs the demodulated modulation information and MIMO multiplex information to MIMO demodulating section 106 and outputs the coding information to deinterleaver 108, rate dematching processing section 109, Log-likelihood-ratio (LLR) combining section 110 and LLR memory section 111.

MIMO demodulating section 106 MIMO-demodulates the baseband signals outputted from RF receiving sections 102 using the channel matrix outputted from channel estimating section 103 and the modulation information and MIMO multiplex information outputted from control signal demodulating section 105 and outputs a soft decision value as a demodulation result to deinterleaver 108.

Stream decoding section 107 has deinterleaver 108, rate dematching processing section 109, LLR combining section 110, LLR memory section 111, FEC decoder 112 and CRC checking section 113 and decodes a signal outputted from MIMO demodulating section 106 on a per stream basis.

Deinterleaver 108 deinterleaves the soft decision value outputted from MIMO demodulating section 106 based on the coding information outputted from control signal demodulating section 105 and outputs the deinterleaved signal to rate dematching processing section 109.

Rate dematching section 109 rate-dematches the signal outputted from deinterleaver 108 based on the coding information outputted from control signal demodulating section 105 and outputs the rate-dematched signal to LLR combining section 110.

LLR combining section 110 combines the LLR of the signal outputted from rate dematching processing section 109 and the LLR stored in LLR memory section 111 based on the coding information outputted from control signal demodulating section 105 and outputs the combined LLR information to LLR memory section 111 and FEC decoder 112.

LLR memory section 111 stores the LLR information outputted from LLR combining section 110 and outputs the LLR information corresponding to the coding information outputted from control signal demodulating section 105 to LLR combining section 110.

FEC decoder 112 decodes the signal outputted from LLR combining section 110. CRC checking section 113 carries out CRC check, and, when confirming that there is no error as a result of check, extracts received data. Further, the CRC check result is outputted to retransmission request signal generating section 114 and packet error record memory section 115.

Retransmission request signal generating section 114 generates a retransmission request signal depending on the check result outputted from CRC checking section 113 and transmits the generated retransmission request signal to the transmitting apparatus.

Packet error record memory section 115 has a memory field matching the number of spatial multiplexing (hereinafter "the number of multiplexed streams") and stores the check results outputted from CRC checking section 113 in this memory field.

Based on a predetermined timing, offset setting section 116 sets an offset for the number of multiplexed streams (hereinafter simply an "offset") based on the CRC check result stored in packet error record memory section 115. To be more specific, offset setting section 116 classifies packet error rates (hereinafter "PER") into predetermined ranges and associates an offset control value with each range. For example, offset setting section 116 has a table such as shown in FIG. 3, and, according to the table shown in FIG. 3, lowers an offset by 2 dB when the PER (indicated by "p" in the figure) is less than 0.0005 and lowers an offset by 1 dB when the PER is equal to or more than 0.0005 and less than 0.005. Further, offset setting section 116 maintains an offset when the PER is equal to or more than 0.005 and less than 0.05 and increases an offset by 1 dB when the PER is equal to or more than 0.05 and less than 0.5. Further, offset setting section 116 increases an offset by 2 dB when the PER is equal to or more than 0.5.

Then, offset setting section 116 calculates the PER based on whether or not there are errors at a specific number of streams stored in packet error record memory section 115 and sets the offset associated with the calculated PER. The set offset is outputted to feedback information generating section 117. The offset will be described in detail later.

Feedback information generating section 117 generates feedback information showing the SINR as quality measurement result of each stream outputted from received quality measuring section 104 and the offset for the number of multiplexed streams outputted from offset setting section 116 and transmits the generated feedback information to the transmitting apparatus.

Figure 4:
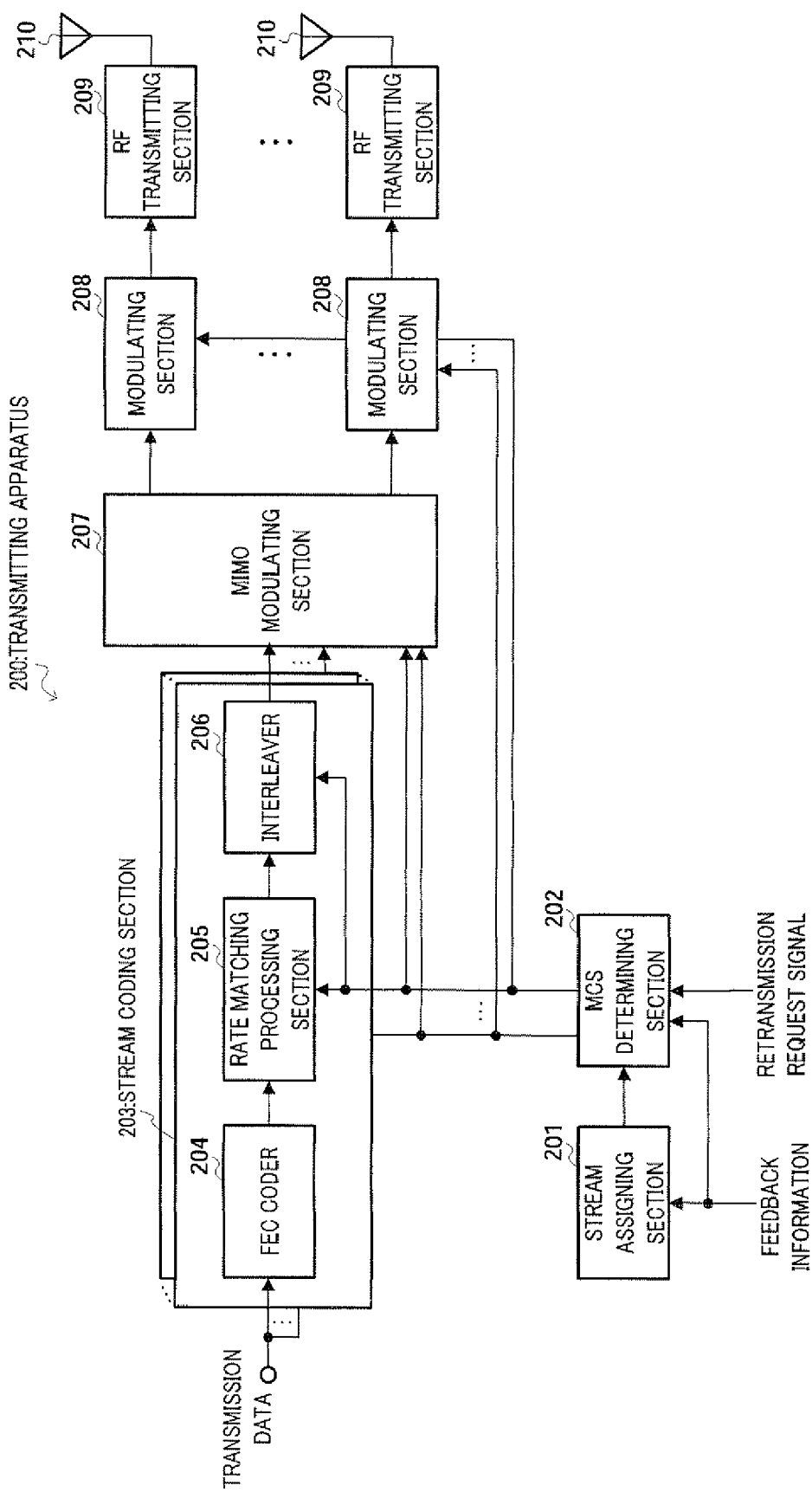
FIG. 4 is a block diagram showing a configuration of the transmitting apparatus according to Embodiment 1 of the present invention.

FIG. 4 is a block diagram showing a configuration of transmitting apparatus 200 according to Embodiment 1 of the present invention. In this figure, stream assigning section 201 receives the feedback information transmitted from receiving apparatus 100, carries out assignment of streams using the SINR of each stream and the offset for the number of multiplexed streams included in the received feedback information, and reports the assigned streams to MCS determining section 202. By the way, the operation of stream assigning section 201 will be described in detail later.

MCS determining section 202 receives the feedback information and the retransmission request signal transmitted from receiving section 100, determines the modulation scheme and the coding rate applied to each stream reported from stream assigning section 201 based on the SINR of each stream included in the received feedback information, and outputs the determined coding rate (coding information) to rate matching processing section 205 and interleaver 206 in stream coding section 203, the MIMO multiplex information to MIMO modulating section 207 and the modulation scheme (modulation information) to modulating section 208.

Stream coding section 203 has FEC coder 204, rate matching processing section 205 and interleaver 206, and encodes transmission data on a per stream basis.

FEC coder 204 FEC-encodes transmission data using a predetermined coding scheme and outputs the FEC-encoded transmission data to rate matching processing section 205.

Rate matching processing section 205 rate-matches the transmission data outputted from FEC coder 204 with the coding rate outputted from MCS determining section 202 and outputs the rate-matched transmission data to interleaver 206.

Interleaver 206 rearranges the transmission data outputted from rate matching processing section 205 based on the coding information outputted from MCS determining section 202 according to a predetermined bit pattern, and outputs the result to MIMO modulating section 207.

MIMO modulating section 207 distributes the bit sequence outputted from interleaver 206 to each stream based on the MIMO multiplex information outputted from MCS determining section 202.

Modulating section 208 generates a modulated symbol of each stream from the bit sequence outputted from MIMO modulating section 207 using the modulation information outputted from MCS determining section 202. RF transmitting sections 209 up-convert the generated modulated symbols to carrier signals of radio frequency and transmit the signals through antennas 210.

Figure 5:
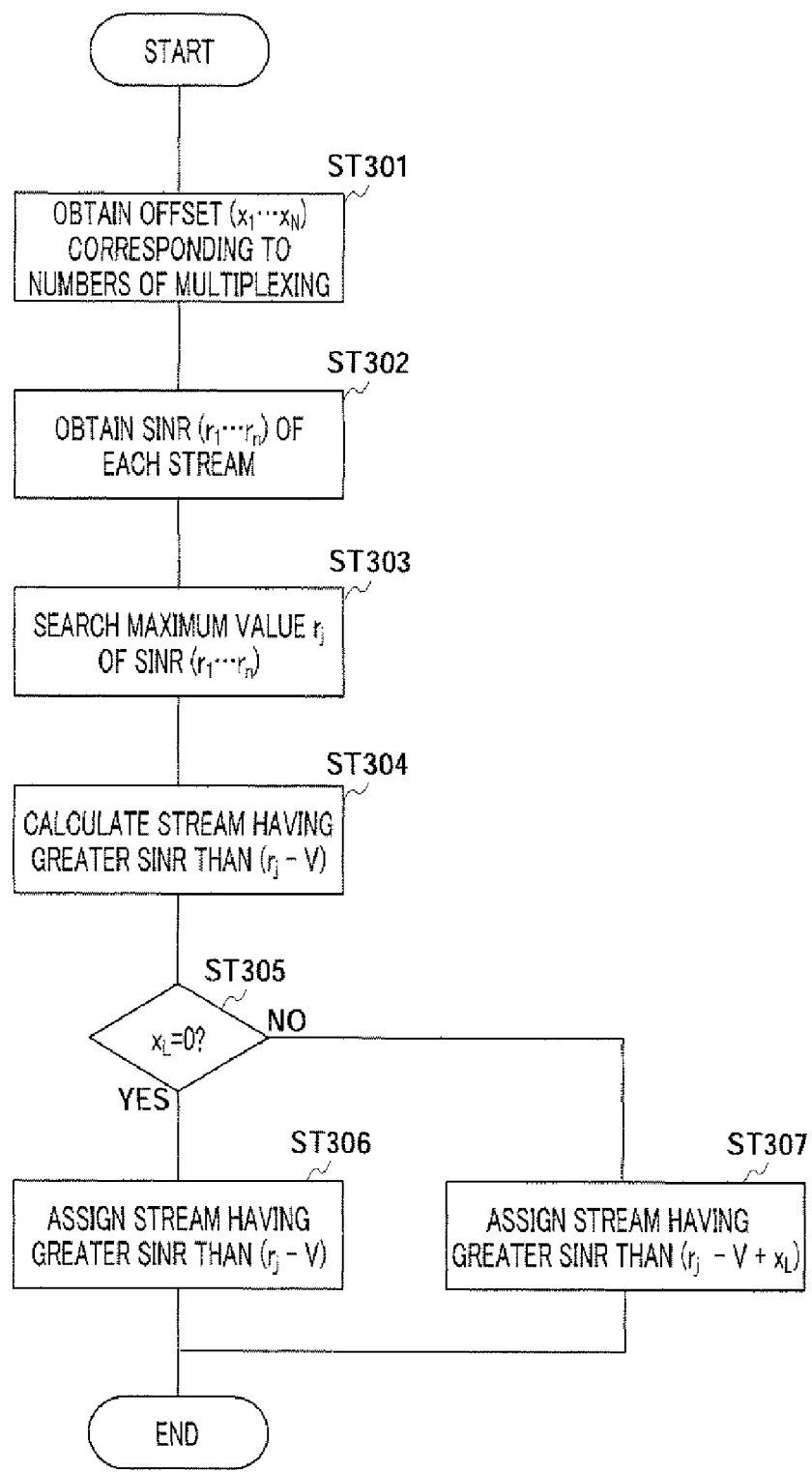
FIG. 5 is a flowchart indicating stream assignment processing in the stream assigning section shown in FIG. 4.

FIG. 5 is a flowchart indicating stream assignment processing of stream assigning section 201 shown in FIG. 4. In this figure, in step (hereinafter "ST") 301, offsets $(x_1, x_2, \ldots, x_N)$ [dB], where the number of multiplexed streams is 1 to N) corresponding to the numbers of multiplexed streams are obtained from the feedback information. In ST302, the SINR $(r_1, r_2, \ldots, r_n$ [dB], where the stream numbers is 1 to n) of each stream is obtained from the feedback information.

In ST303, maximum value $r_j$ of the SINR obtained in ST302 is searched. In ST304, the number of streams L having greater SINR than the value $(r_j-V)$ obtained by subtracting predetermined value V from maximum value $r_j$ searched in ST303, is calculated.

In ST305, it is decided whether or not offset XL corresponding to the number of streams L calculated in ST304 is zero, and the flow proceeds to ST306 when it is decided that the offset is zero ("YES") and proceeds to ST307 when it is decided that the offset is not zero ("NO").

In ST306, stream assignment processing is finished by carrying out assignment of streams having greater SINR's than $(r_j-V)$, as streams for use.

On the other hand, in ST307, stream assignment processing is finished by carrying out assignment of streams having greater SINR's than the value $(r_j-V+x_L)$ obtained by adding an offset to $(r_j-V)$, as a stream for use. In this way, the number of streams to be assigned is more likely to increase reflecting offset $x_L$. That is, the number of streams to be assigned is more likely to decrease when $x_L$ is a positive value and increase when $x_L$ is a negative value.

In this way, by calculating the number of streams having SINR's within a predetermined range by using the best SINR out of the SINR's of all streams as a threshold value, adjusting the predetermined range according to an offset when the offset associated with the number of calculated streams is other than 0 and carrying out assignment of streams within the adjusted range, it is possible to control the number of streams to be assigned.

Figure 6:
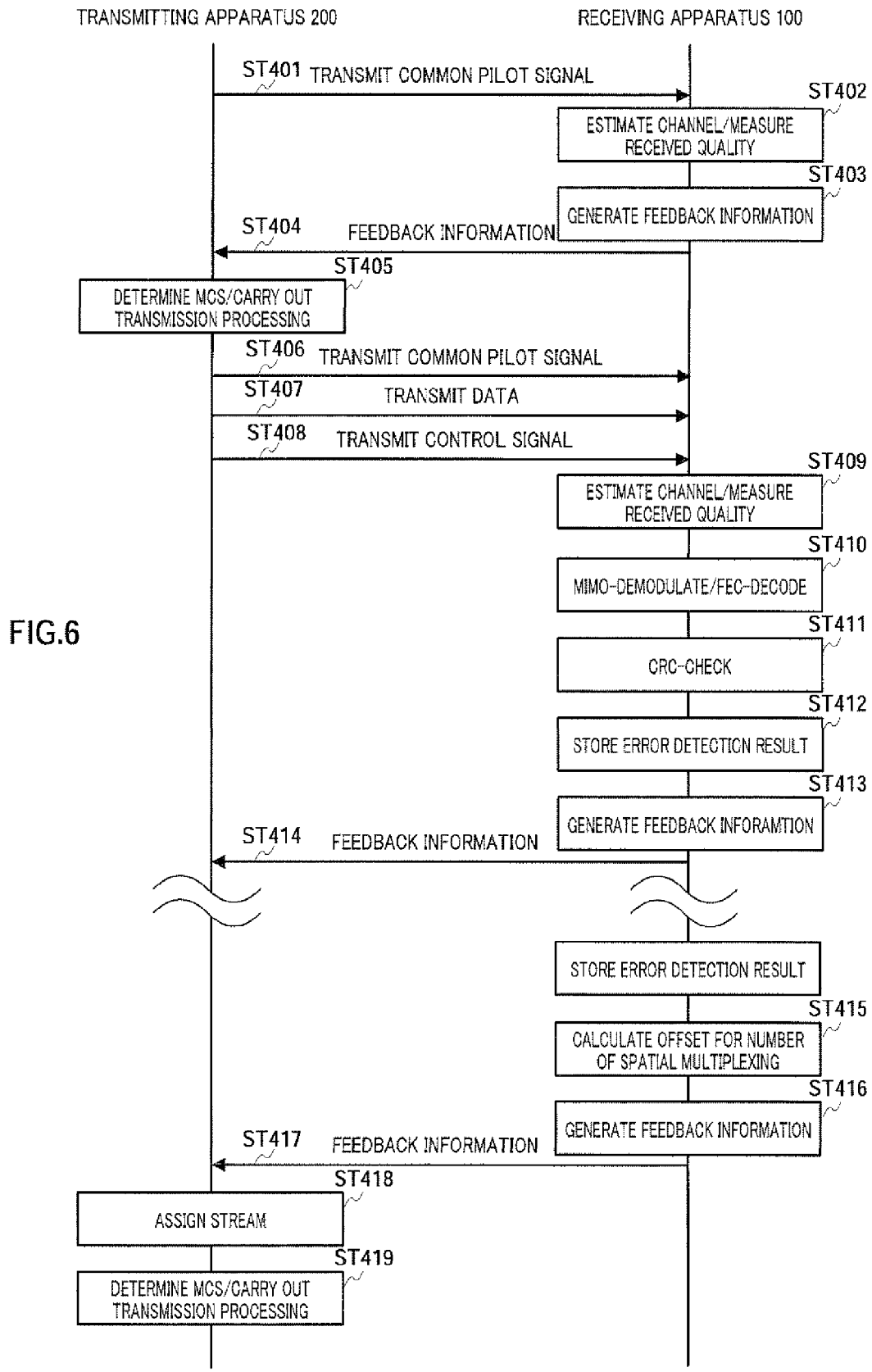
FIG. 6 is a sequence diagram indicating operations of the receiving apparatus shown in FIG. 2 and the transmitting apparatus shown in FIG. 4.

Next, the operations of above receiving apparatus 100 and transmitting apparatus 200 will be described using FIG. 6. In FIG. 6, in ST401, a common reference signal is transmitted from transmitting apparatus 200 to receiving apparatus 100.

in ST402, channel estimating section 103 of receiving apparatus 100 carries out channel estimation and calculates a channel matrix based on the common reference signal transmitted from transmitting apparatus 200. Then, received quality measuring section 104 measures the SINR of each stream using the channel matrix.

In ST403, feedback information generating section 117 generates feedback information showing the received quality measured in ST402. In ST404, feedback information generating section 117 transmits the feedback information generated in ST403, to transmitting apparatus 200.

In ST405, MCS determining section 202 of transmitting apparatus 200 determines the modulation scheme and coding rate used for data transmitted to receiving apparatus 100 based on the received quality information included in the feedback information and performs predetermined transmission processing on the data using the determined modulation scheme and coding rate.

In ST406, the common reference signal is transmitted to receiving apparatus 100. In ST407, the data subjected to transmission processing in ST405 is transmitted to receiving apparatus 100. In ST 408, control signals such as the modulation information, coding information and MIMO multiplex information are transmitted to receiving apparatus 100.

In ST409, receiving apparatus 100 carries out channel estimation based on the common reference signal transmitted from transmitting apparatus 200 and measures received quality of each stream using the channel matrix obtained by channel estimation.

In ST410, the data transmitted from transmitting apparatus 200 is MIMO-demodulated and FEC-decoded according to the control signals transmitted from transmitting apparatus. In ST411, the decoded data is CRC-checked.

In ST412, the CRC check result (result of whether or not there is an error) is stored in a memory field of packet error record memory section 115 matching the number of multiplexed streams represented by the MIMO multiplex information included in the control signals.

In ST413, feedback information showing the received quality measured in ST409 is generated. In ST414, the feedback information generated in ST413 is transmitted to transmitting apparatus 200. After ST414, processings of ST405 to ST414 are repeated between transmitting apparatus 200 and receiving apparatus 100. By repeating these processings, packet error record memory section 115 stores a record of whether or not there is an error.

In ST415, offset setting section 116 of receiving apparatus 100 calculates an offset based on the record of whether there is an error stored in packet error record memory section 115, at a predetermined timing. Further, when the predetermined timing comes per predetermined period (for example, every five seconds), offset calculation is controlled on a regular basis, and, when the predetermined timing is defined by a predetermined number of times (for example, by a thousand times) stored in packet error record memory section 115, the offset calculation is carried out using event-driven control. Moreover, packet error record memory section 115 may store values obtained by successively counting the number of errors from the start of communication or may store newly counted values by resetting the record stored per timing of offset calculation.

In ST416, feedback information showing received quality and an offset is generated. In ST417, the feedback information generated in ST416 is transmitted to transmitting apparatus 200.

In ST418, stream assigning section 201 of transmitting apparatus 200 carries out assignment of streams using the received quality and the offset included in the feedback information. In ST419, MCS determining section 202 determines the modulation scheme and the coding rate used for data transmitted to receiving apparatus 100 based on the received quality included in the feedback information and performs predetermined transmission processing on the data using the determined modulation scheme and coding rate.

In this way, according to Embodiment 1, the receiving apparatus calculates the PER based on a record of CRC check results, calculates an offset corresponding to the PER from an offset associated in advance with the PER and feeds back the calculated offset and received quality calculated from a common reference signal to the transmitting apparatus, and the transmitting apparatus carries out assignment of streams using the fed back received quality and offset, so that it is possible to set the number of multiplexed streams associated with the PER which reflects the stream demultiplexing capacity of the receiving apparatus and demultiplex the streams in the receiving apparatus and consequently reduce packet loss and improve transmission efficiency.

Further, although a case has been described with this embodiment where packet error record memory section 115 has a memory field matching the number of multiplexed streams, the present invention is not limited to this and packet error record memory section 115 may have a memory field matching the coding rate.

(Embodiment 2)

Figure 7:
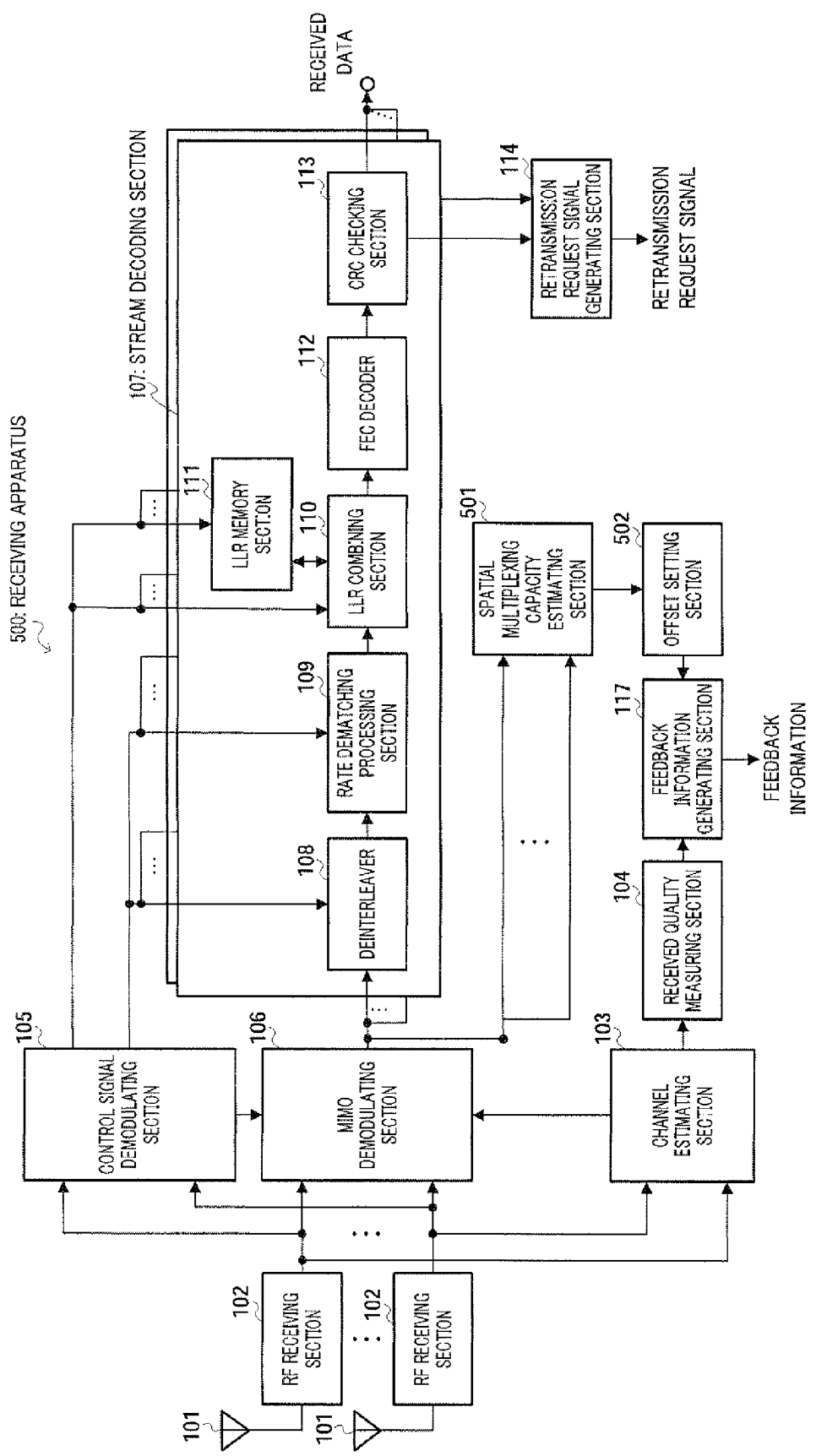
FIG. 7 is a block diagram showing a configuration of the receiving apparatus according to Embodiment 2 of the present invention.

FIG. 7 is a block diagram showing a configuration of receiving apparatus 500 according to Embodiment 2 of the present invention. In this figure, MIMO demodulating section 106 MIMO-demodulates baseband signals outputted from RF receiving sections 102 using a channel matrix outputted from channel estimating section 103, and modulation information and MIMO multiplex information outputted from control signal demodulating section 105, and outputs a soft decision value as a demodulation result to deinterleaver 108 and a portion of the demodulation result, to spatial demultiplexing capacity estimating section 501. This portion of the demodulation result is a symbol separately provided for estimating spatial demultiplexing capacity from an existing reference signal.

Spatial demultiplexing capacity estimating section 501 calculate a tentative decision value of a portion (symbol) of the demodulation result outputted from MIMO demodulating section 106 and calculates the square distance between the calculated tentative decision value and a candidate point. This operation is carried out with respect to all the received streams and a threshold value decision result of the calculated square distance and a threshold value is reported to offset setting section 502.

When the threshold value decision result reported from spatial demultiplexing estimating section 501 is equal to or more than a threshold value, offset setting section 502 increases the offset. On the other hand, when the threshold value decision result is less than a threshold value, offset setting section 502 lowers the offset. The offset set in this way is outputted to feedback information generating section 117.

Figure 8:
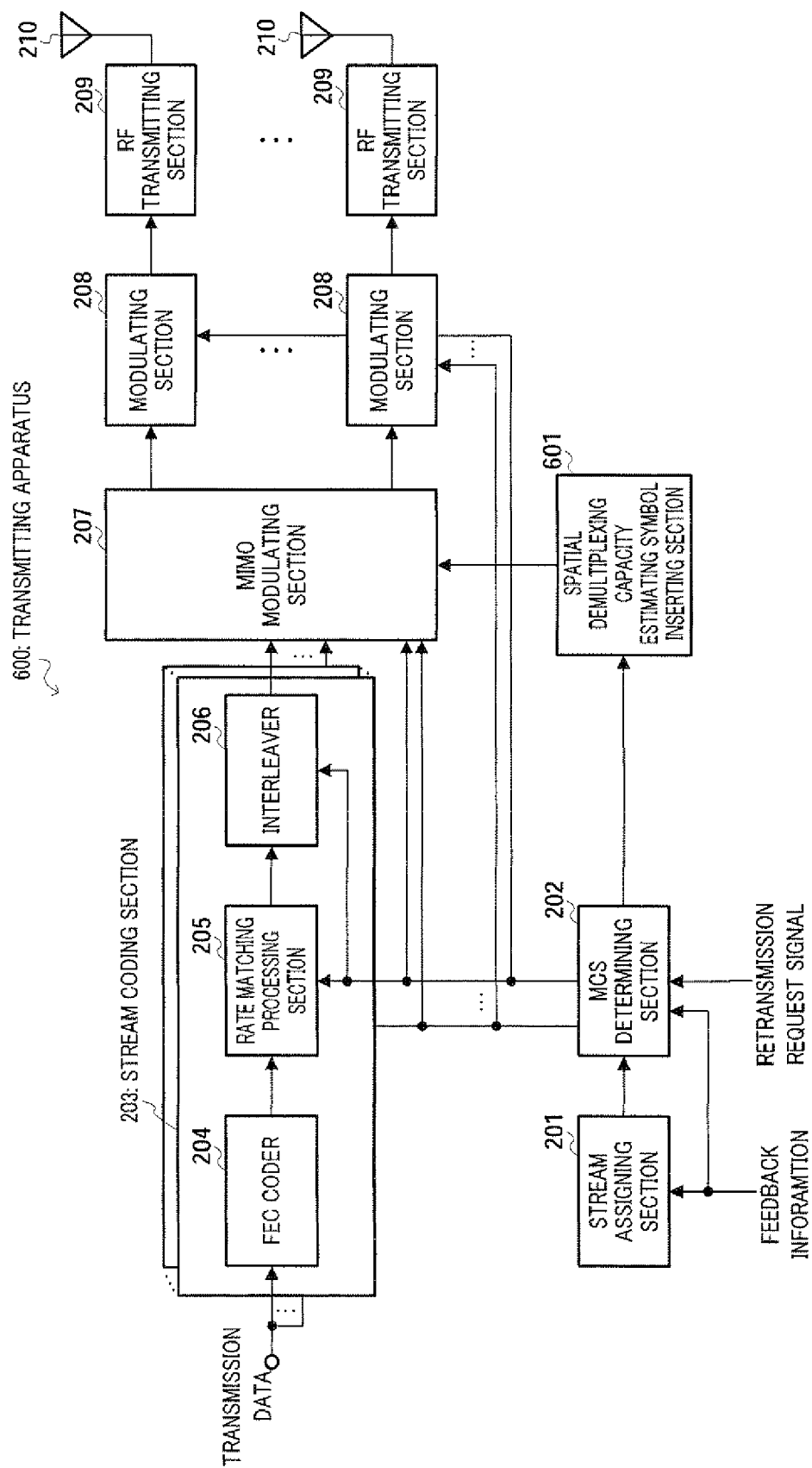
FIG. 8 is a block diagram showing a configuration of the transmitting apparatus according to Embodiment 2 of the present invention.

FIG. 8 is a block diagram showing a configuration of transmitting apparatus 600 according to Embodiment 2 of the present invention. In this figure, MCS determining section 202 receives the feedback information and retransmission request signal transmitted from receiving apparatus 500 and determines the modulation scheme and the coding rate applied to each stream reported from stream assigning section 201 based on the SINR of each stream included in the received feedback information. The determined coding rates (coding information) are outputted to rate matching processing section 205 and interleaver 206 of stream coding section 203, the MIMO multiplex information is outputted to MIMO modulating section 207 and the modulation schemes (modulation information) are outputted to modulating section 208. Further, the number of multiplexed streams to be transmitted is outputted to spatial demultiplexing capacity estimating symbol inserting section 601.

By forming a symbol for estimating spatial demultiplexing capacity according to the number of multiplexed streams outputted from MCS determining section 202 and outputting the formed symbol to MIMO modulating section 207, spatial demultiplexing capacity estimating symbol inserting section 601 inserts the symbol for estimating spatial demultiplexing capacity into a transmission symbol in MIMO modulation section 207. Further, the symbol for estimating spatial demultiplexing capacity may preferably be set as a different random sequence between streams using QPSK which provides a greater inter-symbol distance or a predetermined sequence with small correlation.

In this way, according to Embodiment 2, the receiving apparatus sets an offset according to whether a square distance between a tentative decision value of a symbol for estimating spatial demultiplexing capacity and a candidate point is more than a predetermined threshold value, so that it is possible to control the number of multiplexed streams in a shorter period and consequently employ the number of multiplexed streams following variation, such as fading, in a high-speed radio wave propagation environment.

Further, although a case has been described with this embodiment where a symbol for estimating spatial demultiplexing capacity is used, the present invention is not limited to this and an arbitrary portion of a typical data symbol may be used.

Moreover, although, with this embodiment, the number of threshold values used in spatial demultiplexing capacity estimating section 501 is not mentioned, a plurality of threshold values may be set and an offset corresponding to these threshold value decision results may be set in offset setting section 502.

(Embodiment 3)

Figure 9:
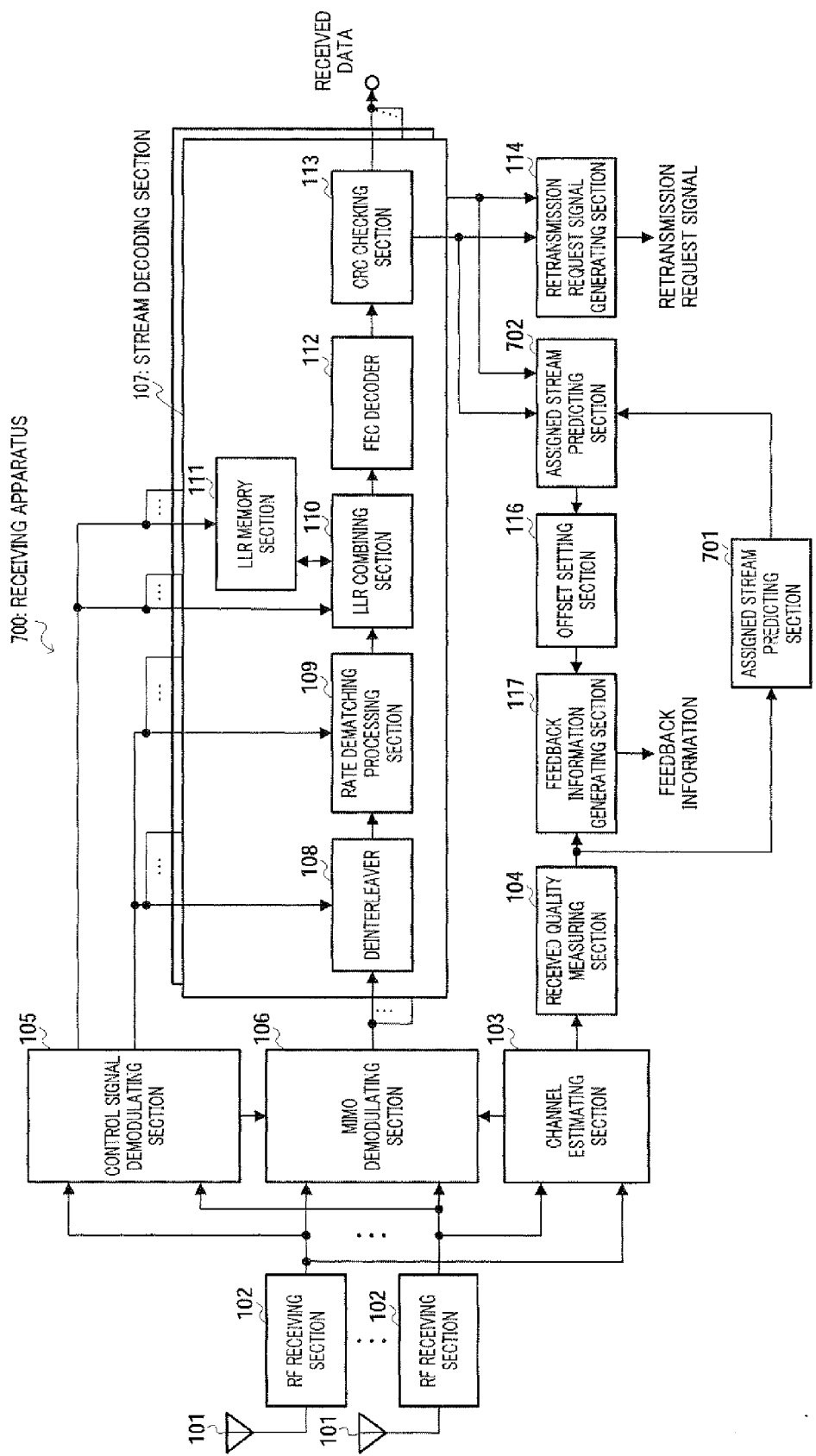
FIG. 9 is a block diagram showing a configuration of the receiving apparatus according to Embodiment 3 of the present invention.

FIG. 9 is a block diagram showing a configuration of receiving apparatus 700 according to Embodiment 3 of the present invention. In this figure, received quality measuring section 104 calculates the SINR of each stream using the channel matrix outputted from channel estimating section 103 as received quality of the SINR of each stream and outputs the calculated SINR to feedback information generating section 117 and assigned stream predicting section 701.

Assigned stream predicting section 701 predicts the number of streams to be assigned in the transmitting apparatus based on the SINR of each stream outputted from received quality measuring section 104 and outputs the predicted number of streams to packet error record memory section 702.

Packet record memory section 702 has a memory field matching the difference between the number of streams outputted from assigned stream predicting section 701 and the number of streams actually assigned in the transmitting apparatus and transmitted, and stores the check result outputted from CRC checking section 113 to the corresponding memory field.

Figure 10:
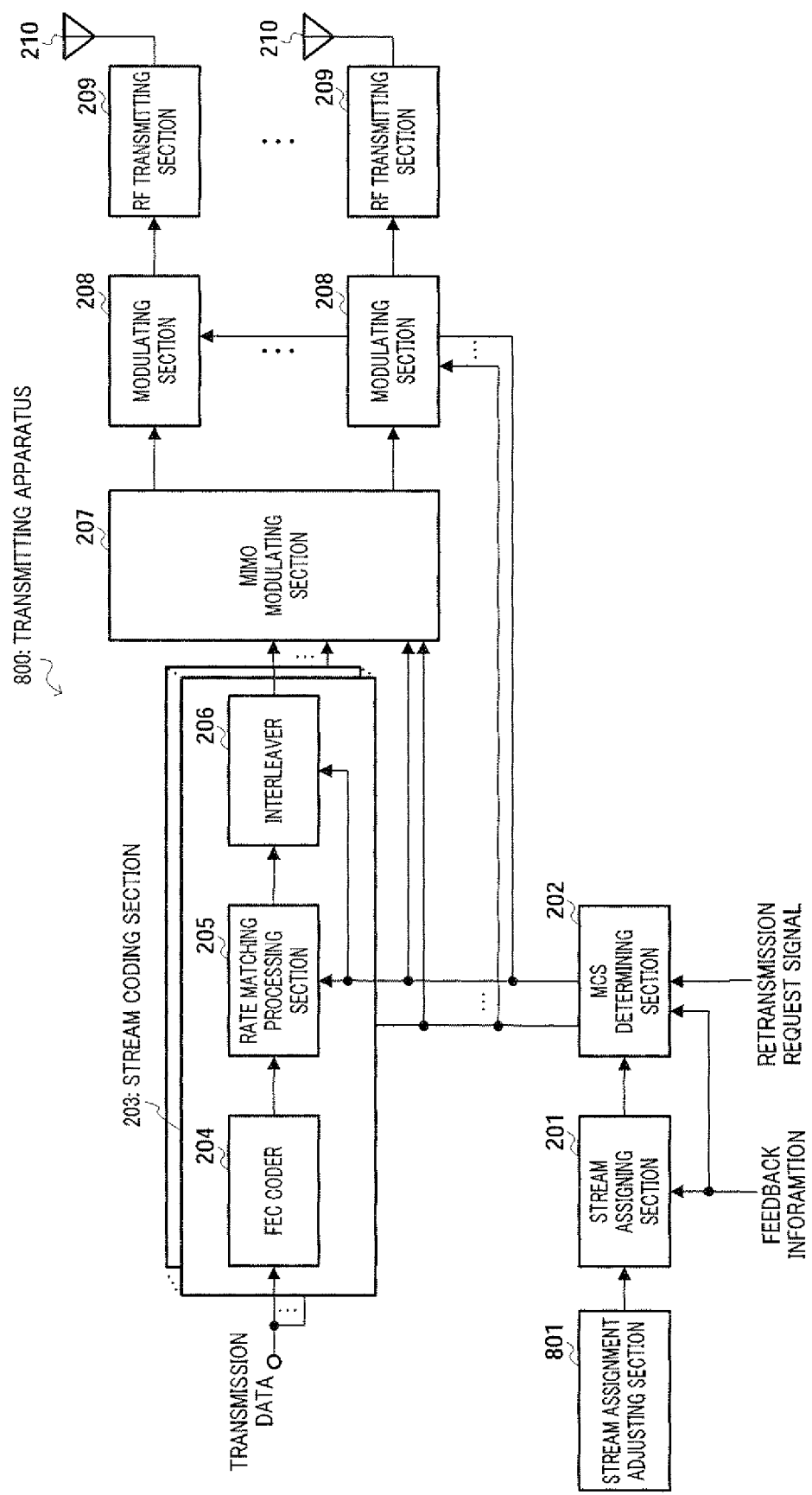
FIG. 10 is a block diagram showing a configuration of the transmitting apparatus according to Embodiment 3 of the present invention.

FIG. 10 is a block diagram showing a configuration of transmitting apparatus 800 according to Embodiment 3 of the present invention. In this figure, stream assignment adjusting section 801 voluntarily determines the number of multiplexed streams and outputs the determined number of multiplexed streams to stream assigning section 201, such that CRC results are equally stored in respective memory fields in packet error record memory section 702 while packet error record memory section 702 of receiving apparatus 700 stores the record of errors and such that stream assigning section 201 assigns an arbitrary stream.

Stream assigning section 201 carries out assignment of streams in the order from streams having better received quality according to the number of multiplexed streams outputted from stream assignment adjusting section 801 and reports the assigned streams to MCS determining section 202.

In this way, according to Embodiment 3, even when the number of multiplexed streams transmitted by the transmitting apparatus is too large or too small compared to the number of multiplexed streams requested to the transmitting side by the receiving apparatus using an offset, it is possible to control the packet loss at minimum by setting in the receiving apparatus the offset associated with the PER for the difference between a predicted value of streams to be assigned and the number of streams actually assigned.

Further, although a case has been described with this embodiment where stream assignment adjusting section 801 voluntarily determines the number of multiplexed streams, the present invention is not limited to this and the number of multiplexed streams may be determined at random.

Although cases have been described with the above embodiment as examples where the present invention is configured by hardware. However, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese patent application No. 2005-164106, filed on Jun. 3, 2005, the entire content of which is expressly incorporated by reference herein.

Industrial Applicability

The transmitting apparatus, receiving apparatus and spatial multiplexing number control method can demultiplex streams per receiver and improve transmission efficiency, and are useful for a MIMO transmitting apparatus and MIMO receiving apparatus.

The invention claimed is:

1. A receiving apparatus comprising:
   a receiving section that receives a signal comprised of streams which are spatially multiplexed;
   a spatial demultiplexing capacity estimating section that estimates a capacity for demultiplexing the signal into the streams by detecting an error of the signal and obtaining an error rate for each of a plurality of multiplexing numbers, each multiplexing number being a number of the streams that are spatially multiplexed;
   an offset setting section that sets an offset value for each of the multiplexing numbers, respectively, based on the obtained error rate using a predetermined association between the obtained error rate and the offset value, the offset values being used for controlling a first multiplexing number from among the multiplexing numbers;
   a received quality measuring section that measures received quality of each of the streams; and
   a feedback section that feeds back, to a transmitting apparatus, information indicating each of the offset values and the received quality.

2. The receiving apparatus according to claim 1, wherein the spatial demultiplexing capacity estimating section comprises a memory that stores a record of an error detection result of the signal, the record of the error detection result being stored for each of the multiplexing numbers, and obtains the error rate calculated from the record.

3. The receiving apparatus according to claim 1, wherein the spatial demultiplexing capacity estimating section comprises a memory that stores a record of an error detection result of the signal, the record of the error detection result being stored for a coding rate of each of the streams, and obtains the error rate calculated from the record.

4. The receiving apparatus according to claim 1, wherein the spatial demultiplexing capacity estimating section calculates a tentative decision value of a symbol obtained by demodulating the signal, and estimates the capacity based on whether a square distance between the calculated tentative decision value and a candidate point exceeds a predetermined threshold value.

5. The receiving apparatus according to claim 1, further comprising:
   a predicting section that predicts, based on the received quality, the multiplexing number of the streams to be received by the receiving section; and
   a memory that stores a record of an error detection result of the signal, for a difference between the predicted multiplexing number and a multiplexing number of the streams actually received by the receiving section.

6. A transmitting apparatus for communicating with a receiving apparatus that includes a receiving section that receives a signal comprised of streams which are spatially multiplexed; a spatial demultiplexing capacity estimating section that estimates a capacity for demultiplexing the signal into the streams by detecting an error of the signal and obtaining an error rate for each of a plurality of multiplexing numbers, each multiplexing number being a number of the streams that are spatially multiplexed; an offset setting section that sets an offset value for each of the multiplexing numbers, respectively, based on the obtained error rate using a predetermined association between the obtained error rate and the offset value, the offset values being used for controlling a first multiplexing number from among the multiplexing numbers; a received quality measuring section that measures received quality of each of the streams; and a feedback section that feeds back, to a transmitting apparatus, information indicating each of the offset values and the received quality, the transmitting apparatus comprising:

a stream assigning section that controls the first multiplexing number of the streams by obtaining the information indicating the offset values and the received quality, fed back from the receiving apparatus, and by carrying out an assignment of the streams based on the offset values and the received quality indicated by the obtained information; and a transmission processing section that performs transmission processing of the signal comprised of the assigned streams which are spatially multiplexed.

7. The transmitting apparatus according to claim 6, further comprising a symbol inserting section that inserts, into a transmission symbol, a known symbol for estimating the capacity for demultiplexing the signal into the streams in the receiving apparatus.

8. The transmitting apparatus according to claim 6, further comprising a stream assignment adjusting section that determines the first multiplexing number of the streams and outputs the determined first multiplexing number of the streams to the stream assigning section.

9. A spatial multiplexing control method comprising:
at a receiving apparatus:
receiving a signal comprised of streams which are spatially multiplexed;
estimating a capacity for demultiplexing the signal into the streams by detecting an error of the signal and obtaining an error rate for each of a plurality of multiplexing numbers, each multiplexing number being a number of the streams that are spatially multiplexed;
setting an offset value for each of the multiplexing numbers, respectively, based on the obtained error rate using a predetermined association between the obtained error rate and the offset value, the offset values being used for controlling a first multiplexing number from among the multiplexing numbers;
measuring received quality of each of the streams; and
feeding back, to a transmitting apparatus, information indicating each of the offset values and the received quality, and
at the transmitting apparatus:
controlling the first multiplexing number of the streams by carrying out an assignment of the streams based on the information fed back from the receiving apparatus, indicating the offset values and the received quality fed back from the receiving apparatus.

10. A communication system comprising a receiving apparatus and a transmitting apparatus, wherein:
the receiving apparatus comprises:
a receiving section that receives a signal comprised of streams which are spatially multiplexed;
a spatial demultiplexing capacity estimating section that estimates a capacity for demultiplexing the signal into the streams;
an offset setting section that sets an offset value for each of a plurality of multiplexing numbers, respectively, based on an obtained error rate using a predetermined association between the obtained error rate and the offset value, the offset values being used for controlling a first multiplexing number from among the multiplexing numbers;
a received quality measuring section that measures received quality of each of the streams; and
a feedback section that feeds back, to the transmitting apparatus, information indicating each of the offset values and the received quality; and
the transmitting apparatus comprises:
a stream assigning section that controls the first multiplexing number of the streams by obtaining the information indicating the offset values and the received quality, fed back from the receiving apparatus, and by carrying out an assignment of the streams based on the offset values and the received quality indicated by the obtained information; and
a transmission processing section that performs transmission processing of the signal comprised of the assigned streams.

* * * * *